(12) United States Patent
Cui et al.

(10) Patent No.: US 12,210,193 B2
(45) Date of Patent: Jan. 28, 2025

(54) OPTIC FIBER CONNECTOR ASSEMBLY

(71) Applicant: ACON OPTICS COMMUNICATIONS INC., New Taipei (TW)

(72) Inventors: Yangyang Cui, New Taipei (TW); Rui Zhang, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 119 days.

(21) Appl. No.: 17/740,374

(22) Filed: May 10, 2022

(65) Prior Publication Data

US 2022/0381996 A1 Dec. 1, 2022

(30) Foreign Application Priority Data

May 31, 2021 (CN) .......................... 202121190157.7

(51) Int. Cl.
G02B 6/38 (2006.01)

(52) U.S. Cl.
CPC ......... *G02B 6/3825* (2013.01); *G02B 6/3869* (2013.01); *G02B 6/3878* (2013.01); *G02B 6/3893* (2013.01)

(58) Field of Classification Search
CPC ............................................. G02B 6/38–3898
See application file for complete search history.

(56) References Cited

U.S. PATENT DOCUMENTS

| 4,877,303 | A  | * | 10/1989 | Caldwell ............... | G02B 6/3838 65/36 |
| 6,908,233 | B2 | * | 6/2005  | Nakajima ............. | G02B 6/3877 385/53 |
| 11,022,758 | B2 | * | 6/2021  | Chiu .................... | G02B 6/3807 |

(Continued)

FOREIGN PATENT DOCUMENTS

| CN | 102269846 | 12/2011 |
| CN | 203773097 | 8/2014 |

(Continued)

OTHER PUBLICATIONS

Machine translation of Description of JP-3220604-U (Year: 2019).*

(Continued)

*Primary Examiner* — Daniel Petkovsek
*Assistant Examiner* — Emma R. Oxford
(74) *Attorney, Agent, or Firm* — JCIPRNET

(57) ABSTRACT

An optic fiber connector assembly, including at least one adapter and at least one connector, is provided. The adapter is correspondingly connected to the connector. The adapter includes a first housing, at least one sleeve disposed in the first housing, at least one bridging portion extending out of a side of the first housing, and at least one locking arm extending from the side and located next to the bridging portion. The sleeve extends from an inside of the first housing to the corresponding bridging portion. The connector includes a second housing, a ferrule disposed in the second housing in a penetrating manner, and a spring abutted between the second housing and the ferrule. The second housing is sleeved onto the bridging portion, the ferrule is inserted into the sleeve, and the locking arm is buckled onto the second housing.

24 Claims, 6 Drawing Sheets

(56) References Cited

U.S. PATENT DOCUMENTS

| | | | |
|---|---|---|---|
| 2004/0017983 A1 | 1/2004 | Chen et al. | |
| 2004/0072454 A1* | 4/2004 | Nakajima | G02B 6/3825 439/79 |
| 2014/0205239 A1* | 7/2014 | Sato | G02B 6/3893 385/55 |
| 2019/0004254 A1* | 1/2019 | Yoshino | G02B 6/38 |
| 2019/0154922 A1* | 5/2019 | Elenbaas | G02B 6/3888 |
| 2019/0170948 A1* | 6/2019 | Cui | G02B 6/3825 |
| 2019/0212502 A1* | 7/2019 | Hsu | G02B 6/3825 |
| 2019/0271816 A1* | 9/2019 | Wong | G02B 6/3885 |
| 2019/0285808 A1* | 9/2019 | Lee | G02B 6/3816 |
| 2020/0393625 A1* | 12/2020 | Chiu | G02B 6/3825 |
| 2021/0263225 A1* | 8/2021 | Tseng | G02B 6/3825 |
| 2021/0263234 A1* | 8/2021 | Tseng | G02B 6/3891 |
| 2022/0011525 A1* | 1/2022 | Higley | G02B 6/3863 |
| 2022/0099899 A1* | 3/2022 | Ott | G02B 6/3825 |
| 2024/0353644 A1* | 10/2024 | Cui | G02B 6/44528 |

FOREIGN PATENT DOCUMENTS

| | | | | |
|---|---|---|---|---|
| CN | 208818875 | | 5/2019 | |
| CN | 208818875 U | * | 5/2019 | |
| CN | 110673272 A | * | 1/2020 | |
| CN | 110927892 | | 3/2020 | |
| DE | 2939231 | | 4/1981 | |
| JP | 3220604 U | * | 3/2019 | G02B 6/3825 |
| JP | 3223844 | | 11/2019 | |

OTHER PUBLICATIONS

Machine translation of CN-208818875-U (Year: 2019).*
Machine translation of Description of CN 110673272 A. (Year: 2020).*
"Search Report of Europe Counterpart Application", issued on Mar. 14, 2023, p. 1-p. 14.
"Search Report of Europe Counterpart Application", issued on Oct. 24, 2022, p. 1-p. 15.

* cited by examiner

OPTIC FIBER CONNECTOR ASSEMBLY

CROSS-REFERENCE TO RELATED APPLICATION

This application claims the priority benefit of China application serial no. 202121190157.7, filed on May 31, 2021. The entirety of the above-mentioned patent application is hereby incorporated by reference herein and made a part of this specification.

BACKGROUND

Technical Field

The disclosure relates to a connector assembly, and in particular relates to an optic fiber connector assembly.

Description of Related Art

Due to the advantages of high bandwidth and low loss, optic fiber has been widely used as a signal transmission medium in recent years. Therefore, with the expansion of optical communication network technology, wide area networks such as the internet and the intranet have become popular, and at the same time, communication flow has been improved.

Generally speaking, a typical optic fiber connector is composed of a matching female adapter and male optic fiber connector. The female adapter is disposed in the electronic device, and the male optic fiber connector is plugged into the female adapter to establish a connection, so as to achieve the purpose of locking and data transmission at the same time. However, the current situation is that, with the development of technology, due to a relatively large structural size and high spacing ratio, these products often cannot effectively reduce the optical path spacing, and cannot meet the requirements of 5G communication for wiring density.

SUMMARY

The disclosure provides an optic fiber connector assembly, and an adapter and a connector of the optic fiber connector assembly are adapted to each other through the structural outline to achieve the effect of mutual fixation.

The optic fiber connector assembly of the disclosure includes at least one adapter and at least one connector. The adapter is correspondingly connected to the at least one connector. The adapter includes a first housing, at least one sleeve, at least one bridging portion, and at least one locking arm. The sleeve is disposed in the first housing. The bridging portion extends out of a side of the first housing, the sleeve extends from an inside of the first housing to the corresponding bridging portion, and the locking arm extends from the side and is located next to the bridging portion. The connector includes a second housing, a ferrule, and a spring. The ferrule is disposed in the second housing in a penetrating manner, and the spring is abutted between the second housing and the ferrule. The second housing is sleeved onto the bridging portion, the ferrule is inserted into the sleeve, and the locking arm is buckled onto the second housing. An inner wall of the second housing and an outer wall of the bridging portion are polygonally adapted to each other for mutual fixation, preventing the connector and the adapter from rotating relative to each other along the axis.

In an embodiment of the disclosure, the ferrule is divided into an A portion, a B portion, and a C portion along the axis. The A portion is configured to accommodate an optic fiber core and is inserted into the sleeve, the B portion is located between the A portion and the C portion, the B portion is locked onto an accommodating groove in the second housing, the C portion extends from the B portion and is located in the accommodating groove, and the spring is sleeved onto the C portion and is abutted between the B portion and the accommodating groove.

In an embodiment of the disclosure, the ferrule further has a D portion and an E portion. The D portion is connected between the A portion and the B portion and the D portion is configured to abut the bridging portion, and the C portion is connected between the B portion and the E portion. The second housing also has a lip portion located outside the accommodating groove, and the E portion is located outside the second housing and is locked onto the lip portion.

In an embodiment of the disclosure, the ferrule includes a first structure body and a second structure body. The second structure body is sleeved onto a portion of the first structure body. The first structure body has the A portion, and the second structure body has the B portion, the C portion, the D portion, and the E portion.

In an embodiment of the disclosure, an elastic force applied by the spring to the B portion is offset by locking the E portion onto the lip portion.

In an embodiment of the disclosure, the B portion and the accommodating groove are polygonally adapted to each other for mutual fixation, preventing the ferrule and the second housing from rotating relative to each other along the axis.

In an embodiment of the disclosure, the second housing forms an elastic arm structure outside the accommodating groove, and the second housing also has a locking step located on the elastic arm structure. The locking arm is suitable for buckling onto the locking step.

In an embodiment of the disclosure, the adapter further includes at least one partitioning member, and multiple sleeves and multiple bridging portions corresponding to each other. The partitioning member is detachably assembled in the first housing, so that there is one partitioning member between any adjacent two of the sleeves.

In an embodiment of the disclosure, the partitioning member is a T-shaped structure body, a clamping tube extends from each of a pair of wing portions of the T-shaped structure body, and each clamping tube corresponds to one of the bridging portions, and each clamping tube accommodates one of the sleeves, so that the sleeve is accommodated in the corresponding bridging portion.

In an embodiment of the disclosure, the partitioning member is a T-shaped structure body, a partitioning plate of the T-shaped structure body has at least one first rib and at least one first protrusion, and the first housing has at least one first guide groove and at least one opening. The T-shaped structure body is moved into the first housing by matching the first rib and the first guide groove, and the T-shaped structure body is fixed in the first housing by snapping the first protrusion onto the opening B.

In an embodiment of the disclosure, the optic fiber connector assembly includes multiple adapters. In any adjacent two of the adapters, one of the adapters includes at least one second rib disposed on a side wall of the first housing, and other one of the adapters includes at least one second guide groove disposed on another side wall of the first housing. By matching the second rib and the second guide groove, any adjacent two of the adapters are combined together.

In an embodiment of the disclosure, in any adjacent two of the adapters, one of the adapters also has a second protrusion located on the side wall, and another one of the adapters also has a slot located on another side wall. When the adjacent two of the adapters are combined, the second protrusion is snapped onto the slot, so that the adjacent two of the adapters are fixed together.

Based on the above, the optic fiber connector assembly is composed of the adapter and the connector. The adapter is suitable for correspondingly connecting at least one connector, that is, multiple connectors can be docked and integrated into the same adapter with the structure illustrated below, and in order to facilitate the fixation effect of the optic fiber core wire, the bridging portion of the adapter and the ferrule of the connector refer to an outline that adapts to each other, so that the inner wall of the second housing of the connector and the outer wall of the bridging portion of the adapter are docked together in a polygonally adapted structure, thereby achieving the required effect of mutual fixation and also preventing the connector and the adapter from rotating relative to each other.

DETAILED DESCRIPTION OF DISCLOSED EMBODIMENTS

Figure 1:
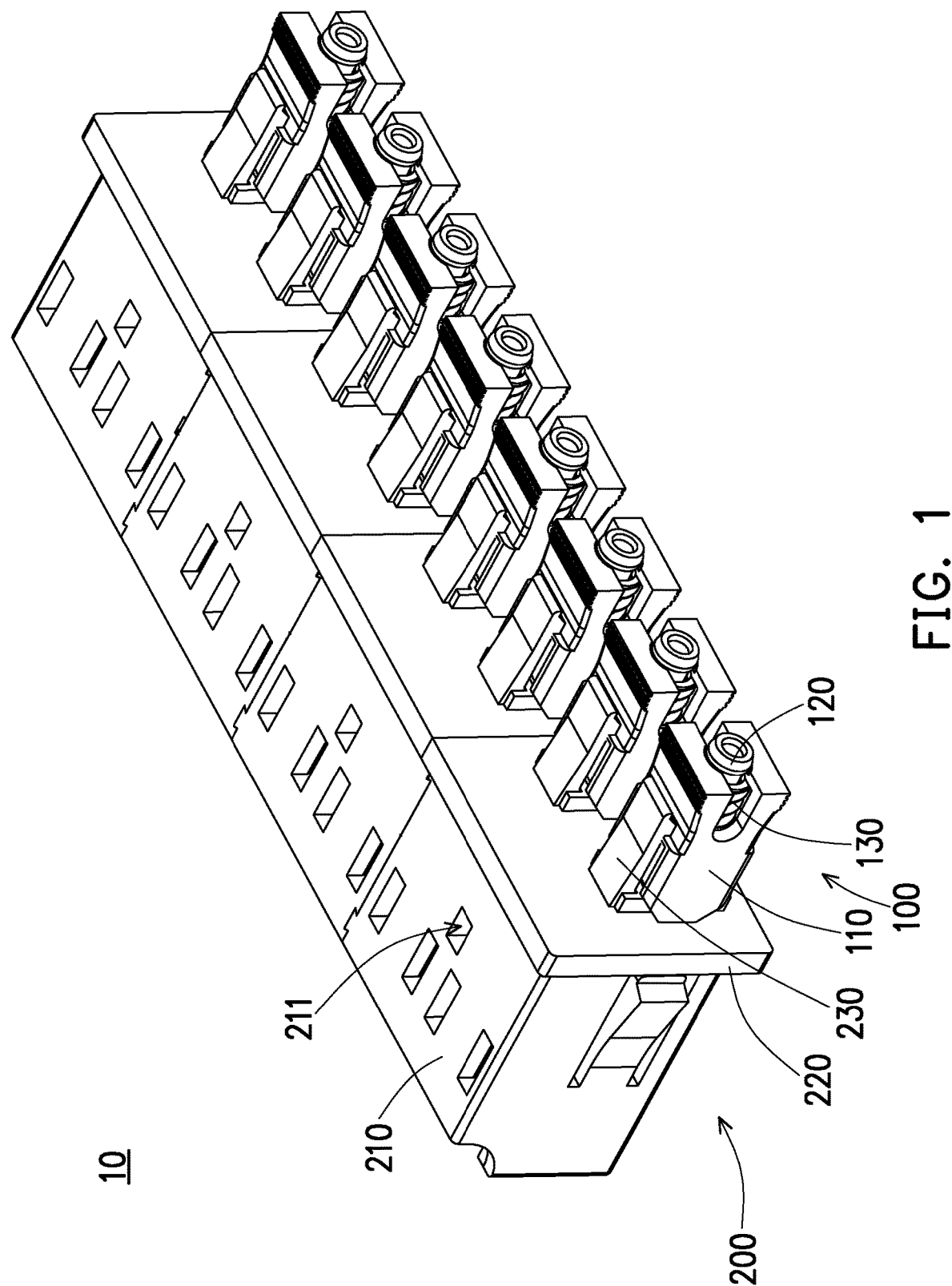
FIG. 1 is a schematic view of an optic fiber connector assembly according to an embodiment of the disclosure.
Figure 2:
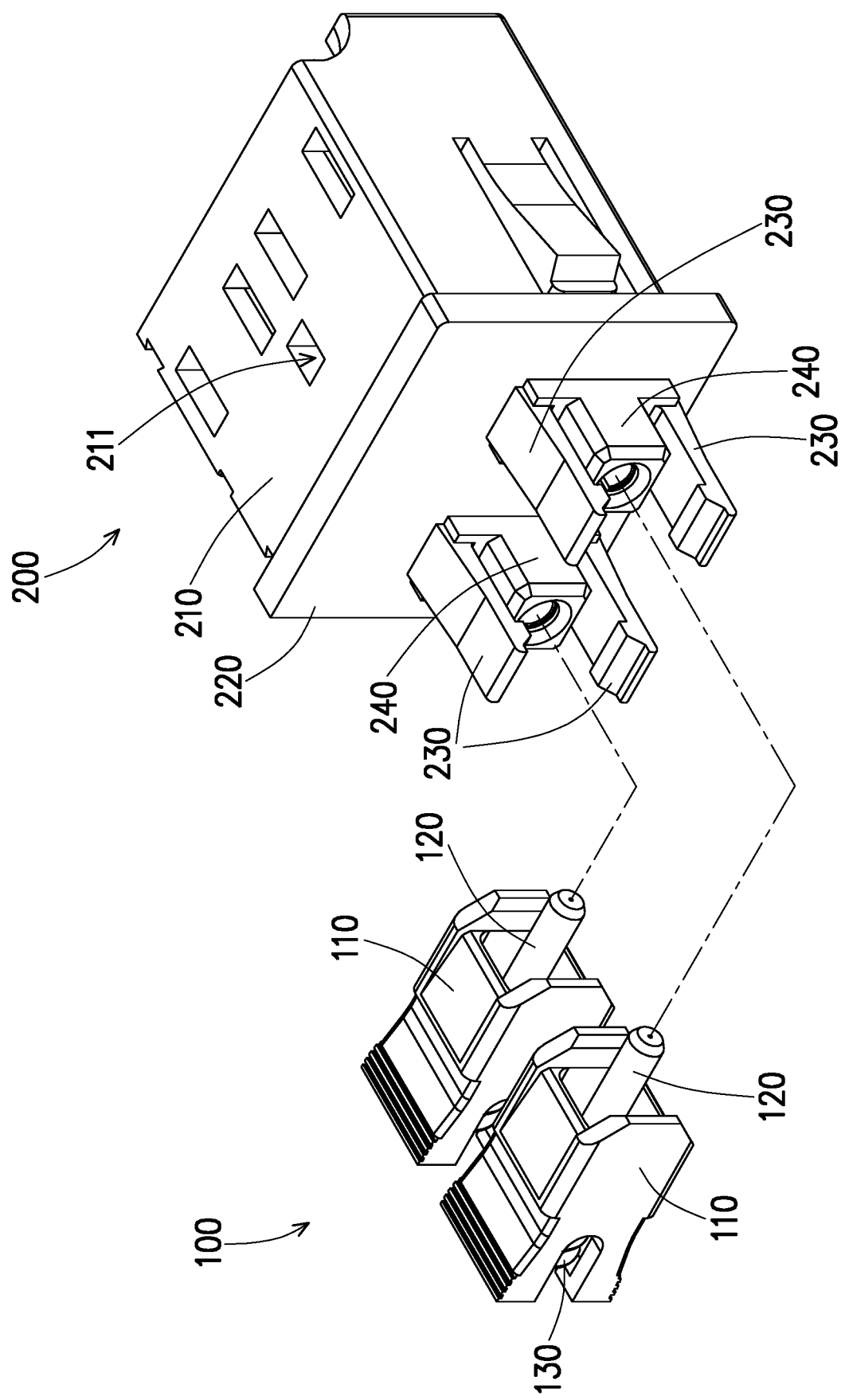
FIG. 2 is a schematic view of an assembly of the optic fiber connector assembly of FIG. 1.

FIG. 1 is a schematic view of an optic fiber connector assembly according to an embodiment of the disclosure. FIG. 2 is a schematic view of an assembly of the optic fiber connector assembly of FIG. 1. Referring to FIG. 1 and FIG. 2 at the same time, an optic fiber connector assembly 10 of the disclosure includes at least one adapter 200 and at least one connector 100, wherein the adapter 200 is correspondingly connected to at least one connector 100. In the multiple combined adapters 200 and connectors 100 shown here, it is exemplified that one adapter 200 is correspondingly connected to two connectors 100.

Figure 3:
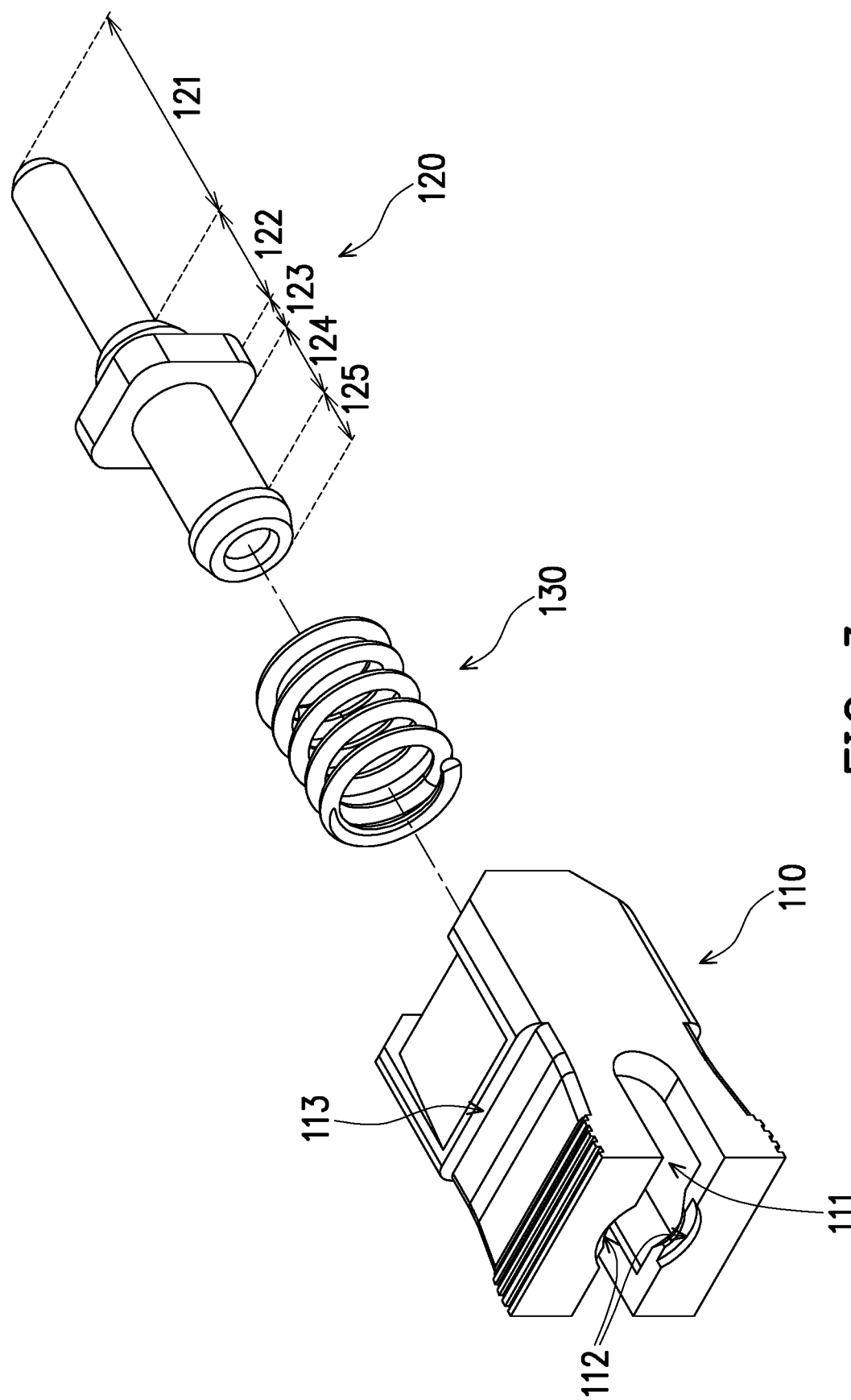
FIG. 3 is an exploded view of a connector.
Figure 4:
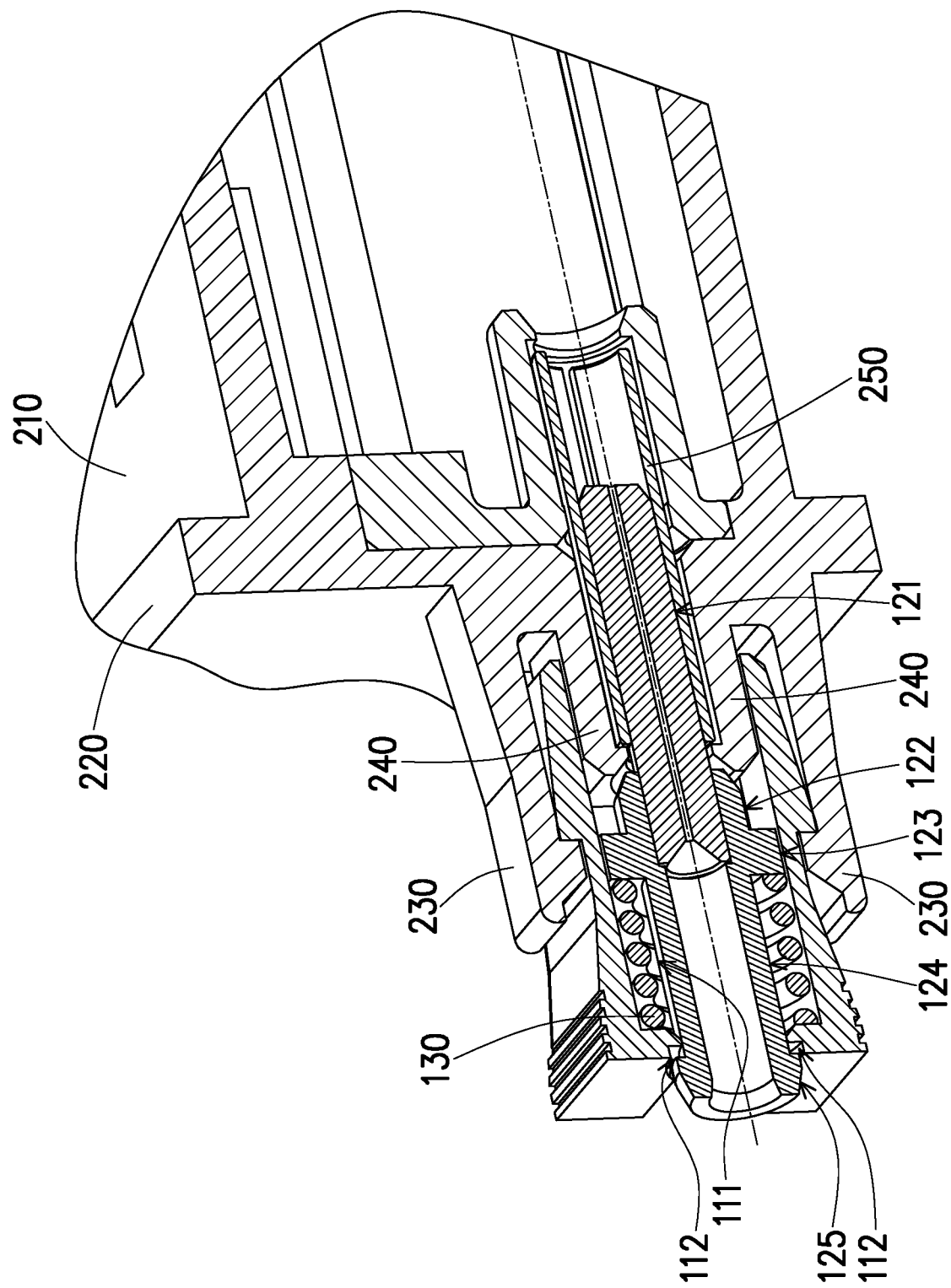
FIG. 4 is a partial cross-sectional view of a optic fiber connector assembly.
Figure 5:
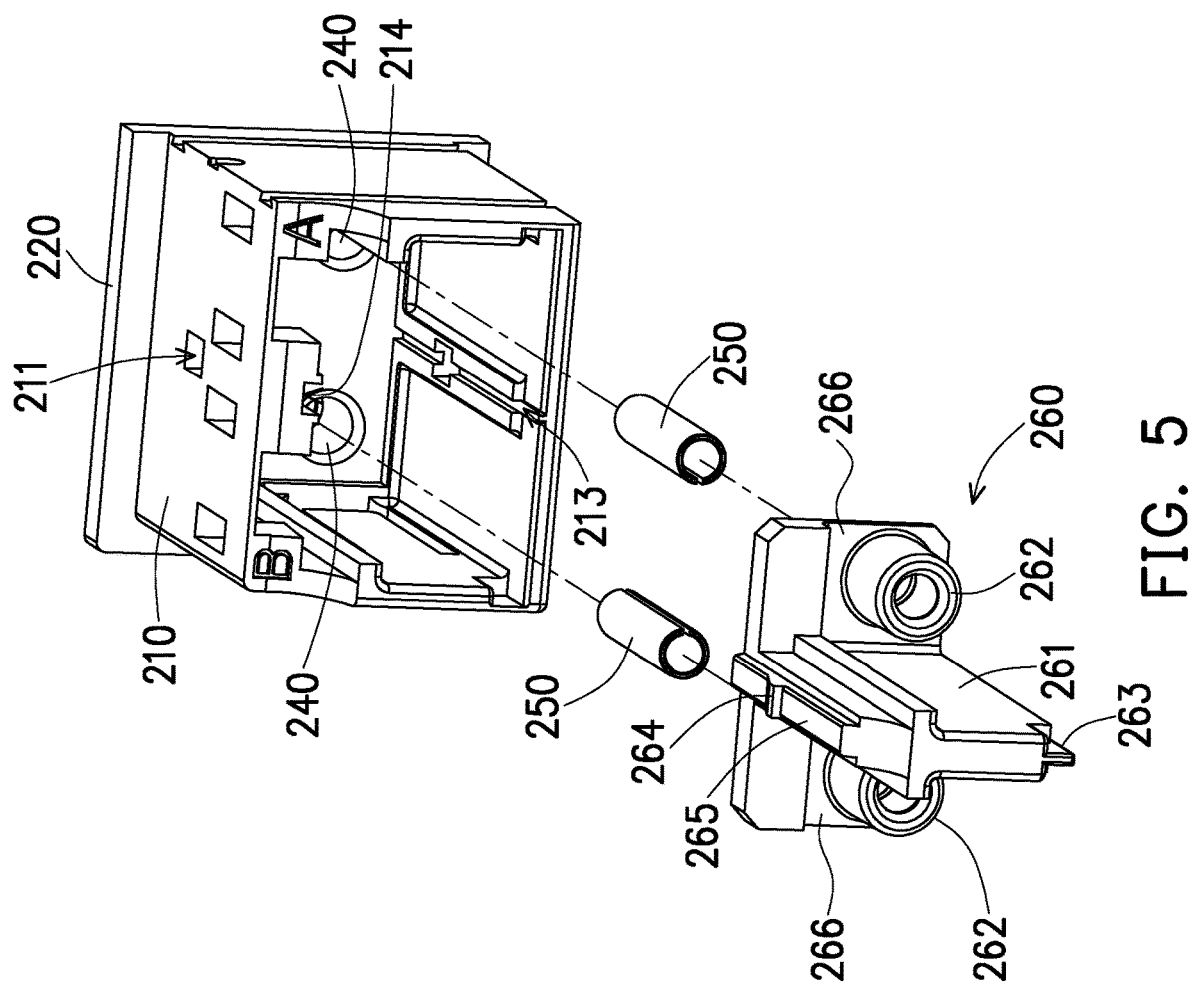
FIG. 5 is an exploded view of an adapter.

FIG. 3 is an exploded view of a connector. Referring to FIG. 2 and FIG. 3 at the same time, the connector 100 includes a second housing 110, a ferrule 120, and a spring 130. The ferrule 120 is disposed in the second housing 110 in a penetrating manner, and the spring 130 is abutted between the second housing 110 and the ferrule 120. FIG. 4 is a partial cross-sectional view of a optic fiber connector assembly. FIG. 5 is an exploded view of an adapter. Referring to FIG. 3 to FIG. 5 at the same time, the adapter 200 of the embodiment includes a first housing 210, at least one sleeve 250 (two sleeves 250 are illustrated herein as an example), at least one bridging portion 240 (two bridging portions 240 are illustrated herein as an example), and at least one locking arm 230 (each of the bridging portions 240 adjoining a pair of the locking arms 230 are illustrated herein as an example). As shown in FIG. 5, the sleeves 250 are disposed in the first housing 210. As shown in FIG. 2 and FIG. 4, the bridging portion 240 extends from one side of the first housing 210, the sleeve 250 extends from the first housing 210 to the corresponding bridging portion 240, and the locking arms 230 extend from the side and are located next to the bridging portion 240, that is, the locking arms 230 are on the same side as the bridging portion 240.

As shown in FIG. 2 and FIG. 4, when the adapter 200 is connected to the connector 100 along an axis (such as a dash-dotted line in the figures), the second housings 110 are sleeved onto the bridging portions 240, the ferrules 120 are inserted into the sleeves 250, and the locking arms 230 are buckled onto the second housings 110. An inner wall of the second housing 110 and an outer wall of the bridging portion 240 are polygonally (shown as a quadrilateral in the embodiment) adapted to each other for mutual fixation, preventing the connector 100 and the adapter 200 from rotating relative to each other along the axis and affecting the fixation effect of the optic fiber core wire.

Further, referring to FIG. 2 to FIG. 4 again, the ferrule 120 of the embodiment is divided into an A portion 121, a B portion 123, and a C portion 124 along the axis. The A portion 121 is configured to accommodate the optic fiber core and is inserted into the sleeves 250, the B portion 123 is located between the A portion 121 and the C portion 124, the B portion 123 is locked onto an accommodating groove 111 in the second housing 110, the C portion 124 extends from the B portion 123 and is located in the accommodating groove 111, and the spring 130 is sleeved onto the C portion 124 and is abutted between the B portion 123 and the accommodating groove 111. Here, the B portion 123 and the accommodating groove 111 are polygonally (shown as a quadrilateral in the embodiment) adapted to each other for mutual fixation, preventing the ferrules 120 and the second housings 110 from rotating relative to each other along the axis.

It should be mentioned that, whether it is the ferrule 120 and the second housing 110 or the second housing 110 of the connector 100 and the bridging portion 240 of the adapter 200, the reason for adopting a quadrilateral adapting outline is that in order to prevent rotation relative to each other along the axis, the quadrilateral adapting outline is a preferred embodiment of the disclosure because the required torque is the maximum.

Furthermore, the ferrule 120 of the embodiment also has a D portion 122 and an E portion 125. The D portion 122 is connected between the A portion 121 and the B portion 123 and the D portion is configured to abut the bridging portion 240, the C portion 124 is connected between the B portion 123 and the E portion 125. The second housing 110 also has lip portions 112 located outside the accommodating groove 111, and the E portion 125 penetrates out of the second housing 110 and is locked onto the lip portions 112. It can be clearly seen from FIG. 4 that the spring 130 located in the accommodating groove 111 exerts a rightward elastic force on the ferrule 120 as shown in FIG. 4 due to the above-mentioned abutting structural relationship, that is, the spring 130 exerts a rightward elastic force on the B portion 123. However, by locking the E portion 125 onto the lip portions 112, the rightward elastic force can be stopped and offset, so that the ferrule 120 and the spring 130 can be stably disposed in the second housing 110. Here, since the outer diameter of the outline of the E portion 125 is larger than that of the C portion 124, the E portion 125 can be smoothly locked onto the outside of the second housing 110.

It should also be noted that, as shown in FIG. 4, in terms of structure, the ferrule 120 of the embodiment includes a first structure body and a second structure body, wherein the second structure body is sleeved onto a portion of the first structure body. Here, the first structure body has an A portion 121, and the second structure body has a B portion 123, a C portion 124, a D portion 122, and an E portion 125.

In addition, for the connector 100, the second housing 110 is formed with upper and lower elastic arm structures outside the accommodating groove 111, and the second housing 110 also has a locking step 113 located on the elastic arm structure, so that when the connector 100 and the adapter 200 are correspondingly connected, the locking arm 230 of the adapter 200 can be buckled onto the locking step 113, and once the user wants to separate the connector 100 from the adapter 200, the locking step 113 can be withdrawn from the locking arm 230 by pressing with force against the elastic arm structure.

Next, referring to FIG. 2, FIG. 4, and FIG. 5, the adapter 200 of the embodiment further includes a longitudinal plate 220 and at least one partitioning member 260. The first housing 210 is located on one side of the longitudinal plate 220, and the bridging portions 240 and the locking arms 230 are located on the other side of the longitudinal plate 220. The partitioning member 260 is configured to separate multiple sleeves 250 that correspond to each other. That is, the partitioning member 260 is detachably assembled in the first housing 210, so that there can be a partitioning member 260 between two adjacent sleeves 250.

Further, the partitioning member 260 of the embodiment is a T-shaped structure body, which includes a partitioning plate 261 and a pair of wing portions 266 located on opposite sides of the partitioning plate 261, wherein the partitioning plate 261 has first ribs 263 and 265 and a first protrusion 264, and the first housing 210 has first guide grooves 213 and 214 and opening 211. The T-shaped structure body is moved into the first housing 210 by matching the first ribs 263 and 265 and the first guide grooves 213 and 214, and the T-shaped structure body is fixed in the first housing 210 by snapping the first protrusion 264 onto the opening 211. In addition, the partitioning member 260 also has a pair of clamping tubes 262 extending from the wing portions 266, corresponding to the bridging portions 240 respectively, so that the sleeves 250 can be stably accommodated and fixed on the clamping tubes 262 and the bridging portions 240 of the adapter 200.

Figure 6:
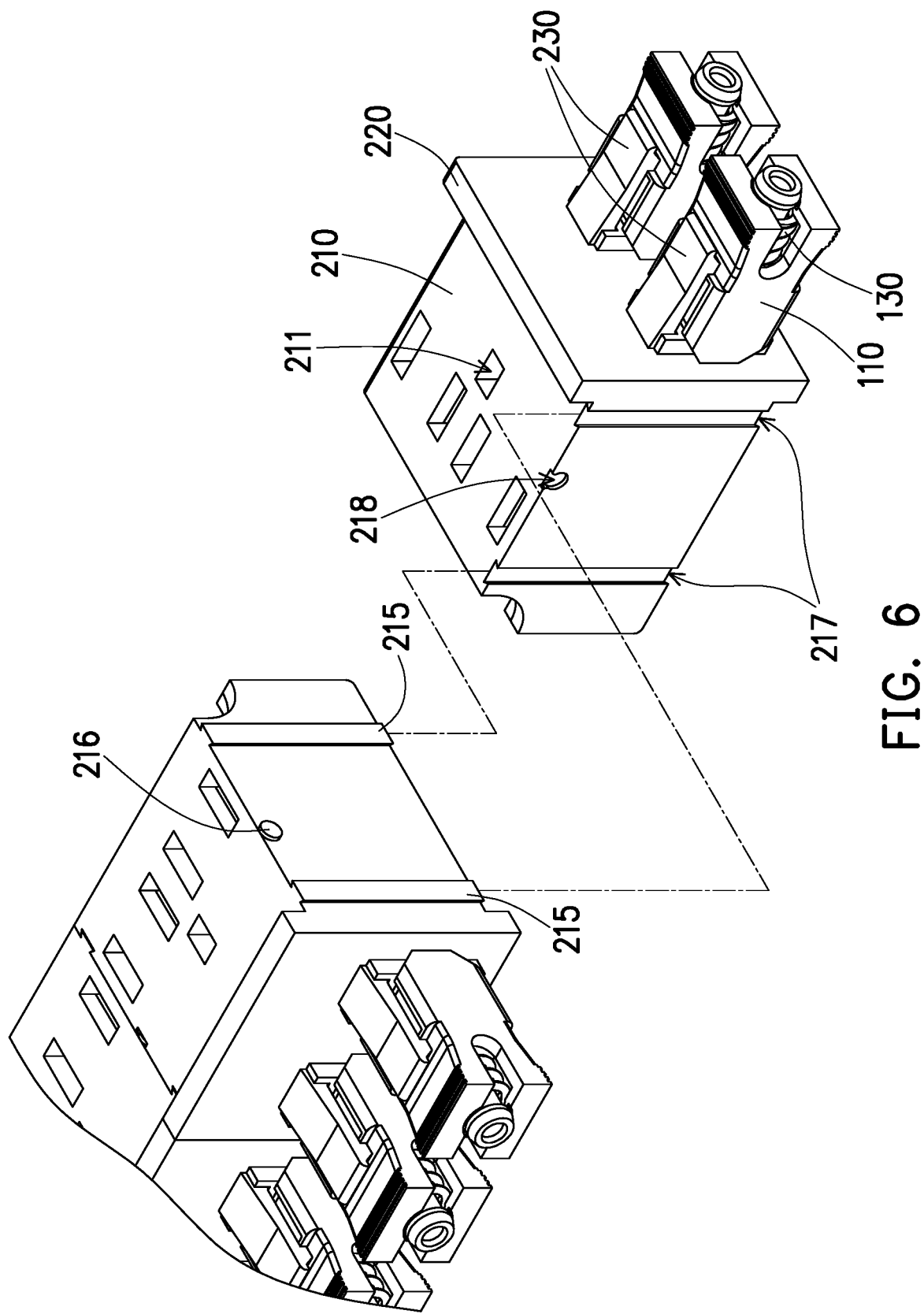
FIG. 6 is a schematic view of a combination of multiple adapters.

FIG. 6 is a schematic view of a combination of multiple adapters. Referring to FIG. 1 and FIG. 6 at the same time, in the embodiment, in two adjacent adapters 200, one of the adapters 200 includes second ribs 215 disposed on the side wall of the first housing 210, and the other adapter 200 includes second guide grooves 217 disposed on the side wall of the first housing 210. By matching the second ribs 215 and the second guide grooves 217, two adjacent adapters 200 can be guided and slidably connected together. At the same time, one of the adapters 200 also has a second protrusion 216 located on the side wall, and the other adapter 200 also has a slot 218 located on the side wall, so as to provide a stopping and locking mechanism for the above-mentioned guiding and slidable connection process, that is, the second protrusion 216 is snapped onto the slot 218, so that two adjacent adapters 200 can be fixed together, and at the same time, the adapter 200 can be restricted to be assembled or disassembled only in a single direction.

To sum up, in the above-mentioned embodiments of the disclosure, the adapter and the connector of the optic fiber connector assembly can be adapted through the structural outline and the effect of mutual fixation is achieved, that is, the mutually adapted structures are polygonal (quadrilateral) along the square plane of the assembly axis of the two (the connector and the adapter), so that the adapted structures interfere to prevent rotation, and thus the required fixation effect when docking the optic fiber is provided.

At the same time, by matching the rib and the guide groove between adjacent adapters to each other, the user can splice adapters one by one according to requirements, so as to achieve the effect of integrating the optic fiber connector assembly, wherein on the mutually adjoining side walls, the two adapters are locked to each other by the protrusion and the slot, and the adapter can be assembled and disassembled only in a single direction, thereby improving the structural stability when the adapters are spliced.

What is claimed is:

1. An optic fiber connector assembly, comprising:
   at least one adapter, comprising:
   a first housing;
   at least one sleeve, disposed in the first housing;
   at least one bridging portion, extending out of a side of the first housing, the sleeve extending from an inside of the first housing to the corresponding bridging portion; and
   two locking arms, being hooks respectively, disposed at two opposite sides of the bridging portion, each extending from the side and located next to the bridging portion; and
   at least one connector, comprising:
   a second housing;
   a ferrule, disposed in the second housing in a penetrating manner; and
   a spring, abutted between the second housing and the ferrule,
   wherein the adapter is suitable for correspondingly connecting the at least one connector,
   wherein the adapter is connected to the connector along an axis, the second housing is sleeved onto the bridging portion, the ferrule is inserted into the sleeve, and each locking arm is buckled onto the second housing,
   wherein an inner wall of the second housing and an outer wall of the bridging portion are polygonally adapted to each other for mutual fixation,
   wherein one end of the spring is contacted to the second housing, and another end of the spring is contacted to the ferrule,
   wherein the second housing is a polygon cross-section thereof being a closed polygonal contour surrounding the axis, the bridging portion is a polygon column adapted to the polygon cross-section, and each of two outer walls of the second housing disposed on opposite sides thereof is buckled between the two locking arms and a side wall of the polygon column,
   wherein the adaptation of the second housing and the bridging portion prevents relative rotation of the connector and the adapter,
   wherein each of the locking arms provides a lateral force and a forward force onto the respective outer wall of the second housing, and a resultant force generated by the forward force and the lateral force pushes the respective outer wall of the second housing toward the bridging portion, and the two resultant forces converge toward the axis.

2. The optic fiber connector assembly according to claim 1, wherein the ferrule is divided into an A portion, a B portion, and a C portion along the axis, the A portion is configured to accommodate an optic fiber core and is inserted into the sleeve, the B portion is located between the A portion and the C portion, the B portion is locked onto an accommodating groove in the second housing, the C portion extends from the B portion and is located in the accommodating groove, and the spring is sleeved onto the C portion and abutted between the B portion and the accommodating groove.

3. The optic fiber connector assembly according to claim 2, wherein the ferrule further has a D portion and an E portion, the D portion is connected between the A portion and the B portion and the D portion is configured to abut the bridging portion, the C portion is connected between the B portion and the E portion, the second housing also has a lip portion located outside the accommodating groove, and the E portion is located outside the second housing and is locked onto the lip portion.

4. The optic fiber connector assembly according to claim 3, wherein the ferrule comprises a first structure body and a second structure body, the second structure body is sleeved onto a portion of the first structure body, the first structure body has the A portion, and the second structure body has the B portion, the C portion, the D portion, and the E portion.

5. The optic fiber connector assembly according to claim 3, wherein an elastic force applied by the spring to the B portion is offset by locking the E portion onto the lip portion.

6. The optic fiber connector assembly according to claim 2, wherein the B portion and the accommodating groove are polygonally adapted to each other for mutual fixation.

7. The optic fiber connector assembly according to claim 2, wherein the second housing forms an elastic arm structure outside the accommodating groove, the second housing also has a locking step located on the elastic arm structure, and each locking arm is suitable for buckling onto the locking step.

8. The optic fiber connector assembly according to claim 1, wherein the adapter further comprises at least one partitioning member and a plurality of sleeves and a plurality of bridging portions corresponding to each other, and the partitioning member is detachably assembled in the first housing, so that there is one partitioning member between any adjacent two of the sleeves.

9. The optic fiber connector assembly according to claim 8, wherein the partitioning member is a T-shaped structure body, a clamping tube extends from each of a pair of wing portions of the T-shaped structure body, each clamping tube corresponds to one of the bridging portions, and each clamping tube accommodates one of the sleeves, so that the sleeve is accommodated in the corresponding bridging portion.

10. The optic fiber connector assembly according to claim 8, wherein the partitioning member is a T-shaped structure body, a partitioning plate of the T-shaped structure body has at least one first rib and at least one first protrusion, the first housing has at least one first guide groove and at least one opening, the T-shaped structure body is moved into the first housing by matching the first rib and the first guide groove, and the T-shaped structure body is fixed in the first housing by snapping the first protrusion onto the opening.

11. The optic fiber connector assembly according to claim 1, comprising a plurality of adapters, wherein in any adjacent two of the adapters, one of the adapters comprises at least one second rib disposed on a side wall of the first housing, another one of the adapters comprises at least one second guide groove disposed on another side wall of the first housing, and by matching the second rib and the second guide groove, any adjacent two of the adapters are combined together.

12. The optic fiber connector assembly according to claim 11, wherein in any adjacent two of the adapters, one of the adapters also has a second protrusion located on the side wall, another one of the adapters also has a slot located on another side wall, and when any adjacent two of the adapters are combined, the second protrusion is snapped onto the slot, so that any adjacent two of the adapters are fixed together.

13. An optic fiber connector assembly, comprising:
at least one adapter, comprising:
a first housing;
at least one sleeve, disposed in the first housing;
at least one bridging portion, extending out of a side of the first housing, the sleeve extending from an inside of the first housing to the corresponding bridging portion;
two locking arms, being hooks respectively, disposed at two opposite sides of the bridging portion, each extending from the side and located next to the bridging portion; and
a longitudinal plate, the first housing located at a side of the longitudinal plate, the bridging portion and the locking arms together located at another side of the longitudinal plate and opposite to the first housing, the sleeve penetrating the longitudinal plate; and
at least one connector, comprising:
a second housing;
a ferrule, disposed in the second housing in a penetrating manner; and
a spring, abutted between the second housing and the ferrule,
wherein the adapter is suitable for correspondingly connecting the at least one connector,
wherein the adapter is connected to the connector along an axis, the second housing is sleeved onto the bridging portion, the ferrule is inserted into the sleeve, and each locking arm is buckled onto the second housing,
wherein an inner wall of the second housing and an outer wall of the bridging portion are polygonally adapted to each other for mutual fixation,
wherein one end of the spring is contacted to the second housing, and another end of the spring is contacted to the ferrule,
wherein each of the locking arms provides a lateral force and a forward force onto the respective outer wall of the second housing, and a resultant force generated by the forward force and the lateral force pushes the respective outer wall of the second housing toward the bridging portion, and the two resultant forces converge toward the axis.

14. The optic fiber connector assembly according to claim 13, wherein the ferrule is divided into an A portion, a B portion, and a C portion along the axis, the A portion is configured to accommodate an optic fiber core and is inserted into the sleeve, the B portion is located between the A portion and the C portion, the B portion is locked onto an accommodating groove in the second housing, the C portion extends from the B portion and is located in the accommodating groove, and the spring is sleeved onto the C portion and abutted between the B portion and the accommodating groove.

15. The optic fiber connector assembly according to claim 14, wherein the ferrule further has a D portion and an E portion, the D portion is connected between the A portion and the B portion and the D portion is configured to abut the bridging portion, the C portion is connected between the B portion and the E portion, the second housing also has a lip portion located outside the accommodating groove, and the E portion is located outside the second housing and is locked onto the lip portion.

16. The optic fiber connector assembly according to claim 15, wherein the ferrule comprises a first structure body and a second structure body, the second structure body is sleeved onto a portion of the first structure body, the first structure body has the A portion, and the second structure body has the B portion, the C portion, the D portion, and the E portion.

17. The optic fiber connector assembly according to claim 15, wherein an elastic force applied by the spring to the B portion is offset by locking the E portion onto the lip portion.

18. The optic fiber connector assembly according to claim 14, wherein the B portion and the accommodating groove are polygonally adapted to each other for mutual fixation.

19. The optic fiber connector assembly according to claim 14, wherein the second housing forms an elastic arm structure outside the accommodating groove, the second housing also has a locking step located on the elastic arm structure, and each locking arm is suitable for buckling onto the locking step.

20. The optic fiber connector assembly according to claim 13, wherein the adapter further comprises at least one partitioning member and a plurality of sleeves and a plurality of bridging portions corresponding to each other, and the partitioning member is detachably assembled in the first housing, so that there is one partitioning member between any adjacent two of the sleeves.

21. The optic fiber connector assembly according to claim 20, wherein the partitioning member is a T-shaped structure body, a clamping tube extends from each of a pair of wing portions of the T-shaped structure body, each clamping tube corresponds to one of the bridging portions, and each clamping tube accommodates one of the sleeves, so that the sleeve is accommodated in the corresponding bridging portion.

22. The optic fiber connector assembly according to claim 20, wherein the partitioning member is a T-shaped structure body, a partitioning plate of the T-shaped structure body has at least one first rib and at least one first protrusion, the first housing has at least one first guide groove and at least one opening, the T-shaped structure body is moved into the first housing by matching the first rib and the first guide groove, and the T-shaped structure body is fixed in the first housing by snapping the first protrusion onto the opening.

23. The optic fiber connector assembly according to claim 13, comprising a plurality of adapters, wherein in any adjacent two of the adapters, one of the adapters comprises at least one second rib disposed on a side wall of the first housing, another one of the adapters comprises at least one second guide groove disposed on another side wall of the first housing, and by matching the second rib and the second guide groove, any adjacent two of the adapters are combined together.

24. The optic fiber connector assembly according to claim 23, wherein in any adjacent two of the adapters, one of the adapters also has a second protrusion located on the side wall, another one of the adapters also has a slot located on another side wall, and when any adjacent two of the adapters are combined, the second protrusion is snapped onto the slot, so that any adjacent two of the adapters are fixed together.

* * * * *